United States Patent
Wang et al.

(10) Patent No.: US 10,116,968 B2
(45) Date of Patent: Oct. 30, 2018

(54) ARITHMETIC ENCODING-DECODING METHOD AND CODEC FOR COMPRESSION OF VIDEO IMAGE BLOCK

(71) Applicant: PEKING UNIVERSITY SHENZHEN GRADUATE SCHOOL, Shenzhen (CN)

(72) Inventors: Zhenyu Wang, Shenzhen (CN); Ronggang Wang, Shenzhen (CN); Shengfu Dong, Shenzhen (CN); Wenmin Wang, Shenzhen (CN); Tiejun Huang, Shenzhen (CN); Wen Gao, Shenzhen (CN)

(73) Assignee: PEKING UNIVERSITY SHENZHEN GRADUATE SCHOOL, Shenzhen (CN)

(*) Notice: Subject to any disclaimer, the term of this patent is extended or adjusted under 35 U.S.C. 154(b) by 321 days.

(21) Appl. No.: 15/060,628

(22) Filed: Mar. 4, 2016

(65) Prior Publication Data

US 2016/0191953 A1 Jun. 30, 2016

Related U.S. Application Data

(63) Continuation-in-part of application No. PCT/CN2014/079435, filed on Jun. 8, 2014.

(51) Int. Cl.
| | | |
|---|---|---|
| H04N 7/12 | (2006.01) | |
| H04N 19/91 | (2014.01) | |
| H04N 19/103 | (2014.01) | |
| H04N 19/105 | (2014.01) | |
| H04N 19/159 | (2014.01) | |

(Continued)

(52) U.S. Cl.
CPC ........... *H04N 19/91* (2014.11); *H04N 19/103* (2014.11); *H04N 19/105* (2014.11); *H04N 19/13* (2014.11); *H04N 19/132* (2014.11); *H04N 19/137* (2014.11); *H04N 19/159* (2014.11); *H04N 19/172* (2014.11); *H04N 19/176* (2014.11);

(Continued)

(58) Field of Classification Search
CPC ...... H04N 19/91; H04N 19/137; H04N 19/13; H04N 19/132; H04N 19/105; H04N 19/85; H04N 19/159; H04N 19/176; H04N 19/172; H04N 19/196; H04N 19/50; H04N 19/103
USPC ..................................... 375/240.02
See application file for complete search history.

(56) References Cited

U.S. PATENT DOCUMENTS

| | | | |
|---|---|---|---|
| 2013/0016782 A1* | 1/2013 | Sasai | H04N 19/197 375/240.13 |
| 2014/0177720 A1* | 6/2014 | Zhang | H04N 19/597 375/240.16 |

* cited by examiner

*Primary Examiner* — Allen C Wong
(74) *Attorney, Agent, or Firm* — Matthias Scholl, PC; Matthias Scholl

(57) ABSTRACT

An arithmetic encoding-decoding method for compression of a video image block. The method includes an encoding process and a decoding process. The encoding process includes: 1) acquiring an information of an image block to be encoded; 2) extracting an encoding command of a weighted skip model; 3) acquiring an index of a reference frame according to the information of the image block to be encoded and the command of the weighted skip model, in which the reference frame includes a prediction block for reconstructing the image block to be encoded; 4) acquiring a context-based adaptive probability model for encoding; and 5) performing arithmetic encoding of the index of the (Continued)

reference frame and writing arithmetic codes into an arithmetically encoded bitstream according to the context-based adaptive probability model for encoding.

8 Claims, 5 Drawing Sheets

(51) Int. Cl.
*H04N 19/172* (2014.01)
*H04N 19/176* (2014.01)
*H04N 19/196* (2014.01)
*H04N 19/50* (2014.01)
*H04N 19/85* (2014.01)
*H04N 19/13* (2014.01)
*H04N 19/132* (2014.01)
*H04N 19/137* (2014.01)

(52) U.S. Cl.
CPC ........... *H04N 19/196* (2014.11); *H04N 19/50* (2014.11); *H04N 19/85* (2014.11)

ARITHMETIC ENCODING-DECODING METHOD AND CODEC FOR COMPRESSION OF VIDEO IMAGE BLOCK

CROSS-REFERENCE TO RELATED APPLICATIONS

This application is a continuation-in-part of International Patent Application No. PCT/CN2014/079435 with an international filing date of Jun. 8, 2014, designating the United States, now pending, the contents of which, including any intervening amendments thereto, are incorporated herein by reference.

BACKGROUND OF THE INVENTION

Field of the Invention

The invention relates to an arithmetic encoding-decoding method and a codec for compression of a video image block.

Description of the Related Art

In the Audio Video coding Standard (AVS), a forward reference frame is encoded through the weighted skip model. The weighted skip model requires recording and transmitting the index of an extra reference frame. In general, the extra reference frame is encoded using an equi-probability model. However, the encoding scheme has a high bit rate.

SUMMARY OF THE INVENTION

In view of the above-described problems, it is one objective of the invention to provide an arithmetic encoding-decoding method and a codec for compression of a video image block. The method and the device of the invention are adapted to greatly reduce the bit rate required in the encoding of the index of the additional reference frame.

To achieve the above objective, in accordance with one embodiment of the invention, there is provided an arithmetic encoding-decoding method for compression of a video image block. The method comprises an encoding process and a decoding process. The encoding process comprises:
1) acquiring an information of an image block to be encoded;
2) extracting an encoding command of a weighted skip model;
3) acquiring an index of a reference frame according to the information of the image block to be encoded and the command of the weighted skip model, in which the reference frame comprises a prediction block for reconstructing the image block to be encoded;
4) acquiring a context-based adaptive probability model for encoding; and
5) performing arithmetic encoding of the index of the reference frame and writing arithmetic codes into an arithmetically encoded bitstream according to the context-based adaptive probability model for encoding.

In a class of this embodiment, the index of the reference frame is represented by a binary number, and a bit number of the binary number is determined by image frame counts of the reference frames.

In a class of this embodiment, the context-based adaptive probability model for encoding is a statistical result of a greater probability event on each bit of the index of the reference frame.

In a class of this embodiment, the encoding process further comprises: updating the context-based adaptive probability model for encoding according to the index of the reference frame after acquiring the index of the reference frame.

The decoding process comprises:
1) acquiring the arithmetically encoded bitstream of the index of the reference frame;
2) acquiring a context-based adaptive probability model for decoding, in which the context-based adaptive probability model for decoding is the statistical result of the greater probability event on each bit of the index of the reference frame;
3) arithmetic decoding the arithmetically encoded bitstream according to the context-based adaptive probability model for decoding corresponding to the bit whereby acquiring a binary value of the bit;
4) acquiring the index of the reference frame according to the binary value of each bit;
5) acquiring the prediction block of the reference frame according to the index of the reference frame; and
6) averaging pixel values of the prediction blocks to obtain a pixel value of a reconstruction block, in which the reconstruction block is the image block to be encoded.

In a class of this embodiment, the decoding process further comprises updating the context-based adaptive probability model for decoding corresponding to the bit according to the binary value of the bit.

In accordance with another embodiment of the invention, there is provided an arithmetic codec for compression of a video image block. The arithmetic codec comprises an encoder and a decoder. The encoder comprises:
a) a first module for acquiring an information of an image block, which is adapted to acquire the information of the image block to be encoded;
b) a second module for extracting an encoding mode, which is adapted to extracting an encoding command of a weighted skip model;
c) a third module for acquiring an index of a reference frame, which is adapted to acquire the index of the reference frame according to the information of the image block to be encoded and the encoding command of the weighted skip model, in which the reference frame comprises a prediction block for reconstructing the image block to be encoded;
d) a fourth module for acquiring a probability model for encoding, which is adapted to acquire the contest-based adaptive probability model for encoding; and
e) a fifth module for arithmetic encoding, which is adapted to performing arithmetic encoding of the index of the reference frame and writing arithmetic codes into an arithmetically encoded bitstream according to the context-based adaptive probability model for encoding.

In a class of this embodiment, the encoder further comprises: a sixth module for updating the probability model for encoding, which is adapted to update the context-based adaptive probability model for encoding according to the acquired index of the reference frame.

In a class of this embodiment, the decoder comprises:
a) a seventh module for acquiring the arithmetically encoded bitstream, which is adapted to acquire the arithmetically encoded bitstream of the index of the reference frame;
b) an eighth module for acquiring a probability model for decoding, which is adapted to acquire a context-based adaptive probability model for decoding, in which the context-based adaptive probability model for decoding is a statistical result of a greater probability event on each bit of the index of the reference frame;

c) a ninth module for arithmetic decoding, which is adapted to arithmetic decode the arithmetically encoded bitstream according to the context-based adaptive probability model for decoding corresponding to the bit whereby acquiring a binary value of the bit;

d) a tenth module for producing the index of the reference frame, which is adapted to acquire the index of the reference frame according to the binary value of each bit;

e) an eleventh module for acquiring the prediction block, which is adapted to acquire the prediction block of the reference frame according to the index of the reference frame; and f) a twelfth module for calculating a reconstruction block, which is adapted to average pixel values of the prediction blocks to obtain a pixel value of the reconstruction block, in which the reconstruction block is the image block to be encoded.

In a class of this embodiment, the decoder further comprises: a thirteenth module for updating the probability model for decoding, which is adapted to update the context-based adaptive probability model for decoding corresponding to the bit according to the binary value of the bit.

Advantages of the arithmetic encoding-decoding method and a codec for compression of a video image block according to embodiments of the invention are summarized as follows.

Because the index of the reference frame is arithmetic encoded according to the context-based adaptive probability model for encoding, the decoding and encoding method and the codec of the invention are capable of better reflecting the probability distribution of the index of the reference frame and obviously reducing the bit rate required in the encoding.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an arithmetic encoding-decoding method for compression of a video image block by weighted skip model are described below. It should be noted that the following examples are intended to describe and not to limit the invention.

When encoding a video image using the weighted skip model, a prediction block of each of two reference frames is adopted. Of the two reference frames, one is a fixed reference frame, and the other is an additional reference frame. During encoding, an index of the additional reference frame is required to be encoded and written into a corresponding bitstream so as to acquire the additional reference frame according to the index thereof during decoding, extract the prediction block of the additional reference frame, and acquire a pixel value of a reconstruction block of the image block to be encoded by combining the prediction block of the fixed reference frame. The concept of the invention is adopting a relative low bit rate to encode the additional reference frame and write the codes into the bitstream.

Figure 1:
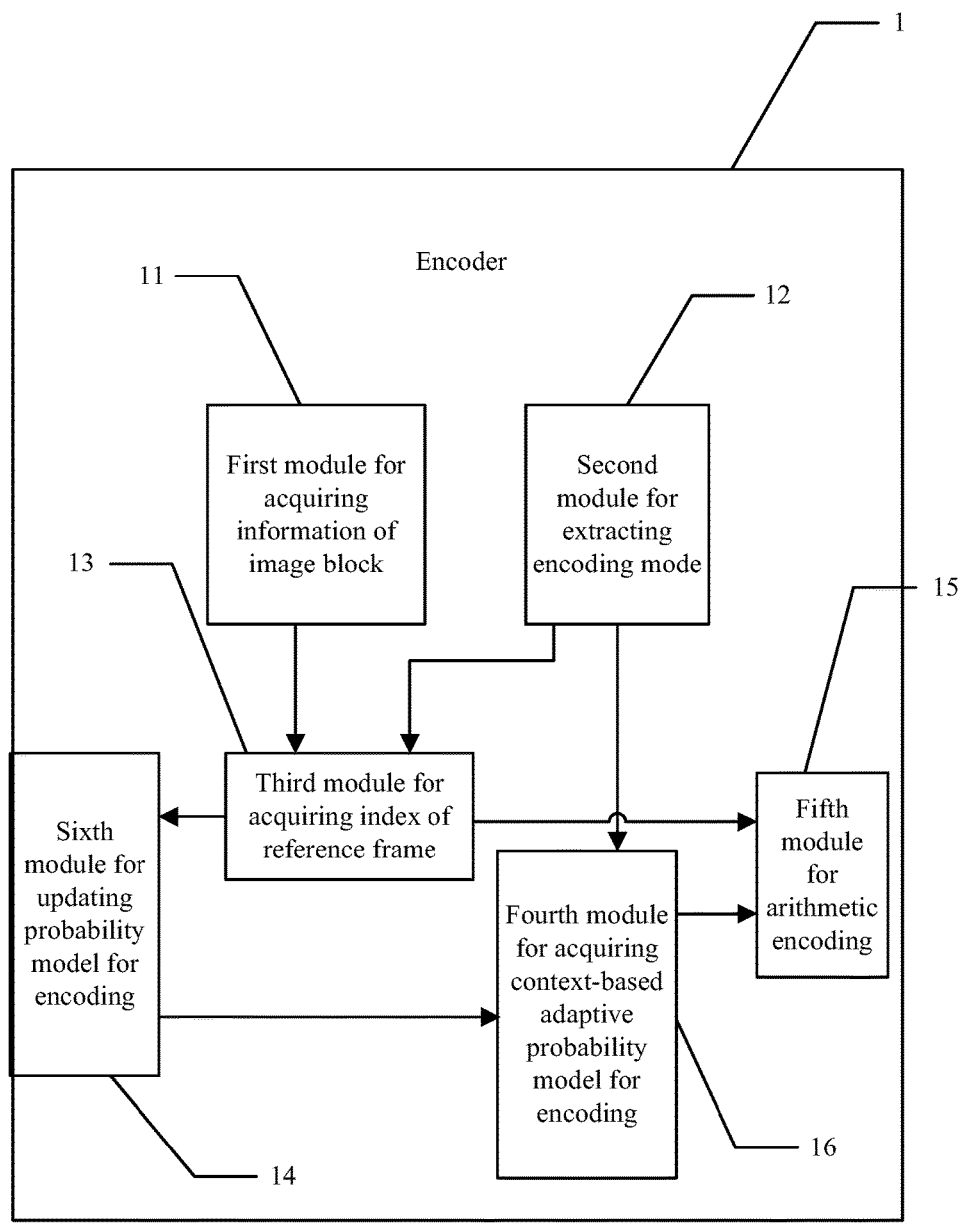
FIG. 1 is a schematic diagram of an arithmetic encoder for compression of a video image block in accordance with one embodiment of the invention.
Figure 2:
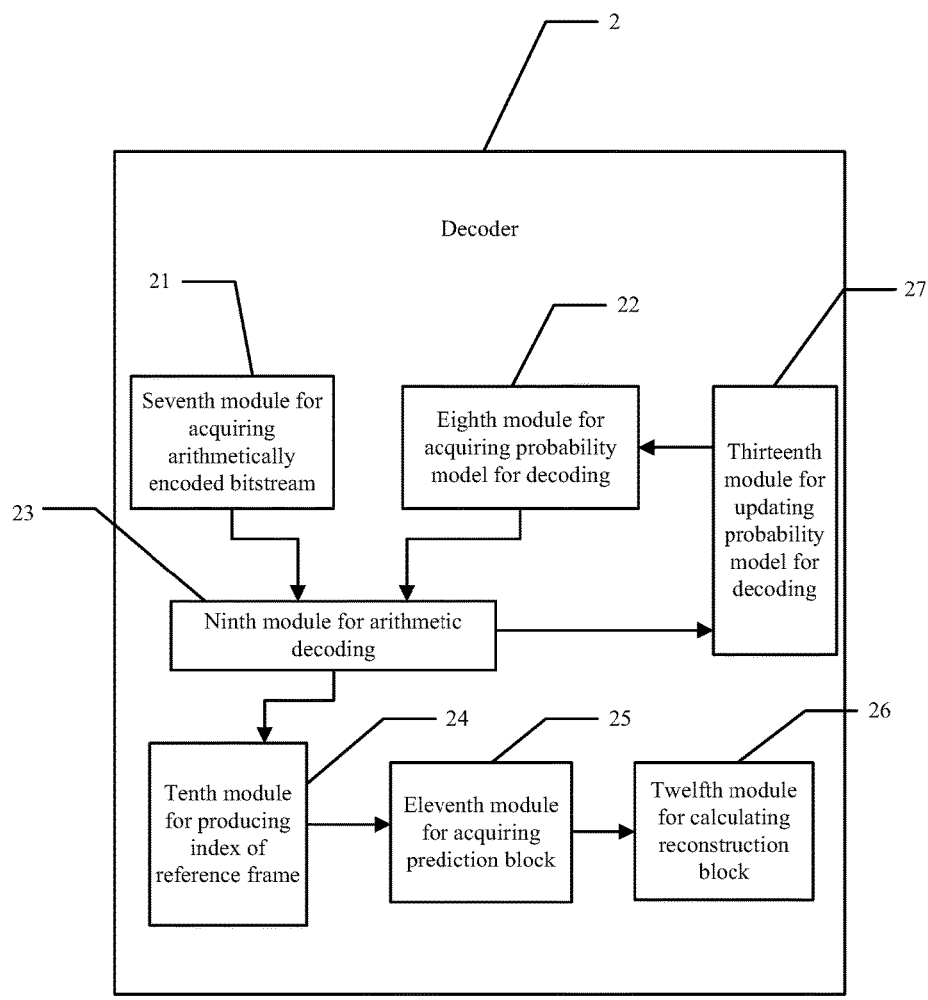
FIG. 2 is a schematic diagram of arithmetic decoder for compression of a video image block in accordance with one embodiment of the invention.

As shown in FIGS. 1-2, an arithmetic codec for compression of a video image block using a weighted skip model comprises: an encoder 1 and a decoder 2. The encoder 1 comprises: a first module 11 for acquiring an information of an image block, a second module 12 for extracting an encoding mode, a third module 13 for acquiring an index of a reference frame, a fourth module 16 for acquiring a context-based adaptive probability model for encoding, and a fifth module 15 for arithmetic encoding, in which, the first module 11 for acquiring the information of the image block is adapted to acquire the information of the image block to be encoded;

the second module 12 for extracting the encoding mode is adapted to extract an encoding command of the weighted skip model;

the third module 13 for acquiring the index of the reference frame is adapted to acquire the index of the reference frame according to the information of the image block to be encoded and the encoding command of the weighted skip model, in which the reference frame comprises a prediction block for reconstructing the image block to be encoded;

the fourth module 16 for acquiring the context-based adaptive probability model for encoding is adapted to acquire the contest-based adaptive probability model for encoding; and the fifth module 15 for arithmetic encoding is adapted to performing arithmetic encoding of the index of the reference frame and writing arithmetic codes into an arithmetically encoded bitstream according to the context-based adaptive probability model for encoding.

In a preferred embodiment, the encoder 1 further comprises a sixth module 14 for updating the probability model for encoding, which is adapted to update the context-based adaptive probability model for encoding according to the acquired index of the reference frame.

As shown in FIG. 2, the decoder 2 comprises: a seventh module 21 for acquiring the arithmetically encoded bitstream, an eighth module 22 for acquiring a probability model for decoding, a ninth module 23 for arithmetic decoding, a tenth module 24 for producing the index of the reference frame, an eleventh module 25 for acquiring the prediction block, and a twelfth module 26 for calculating a reconstruction block, in which, the seventh module 21 for acquiring the arithmetically encoded bitstream is adapted to acquire the arithmetically encoded bitstream of the index of the reference frame;

the eighth module 22 for acquiring the probability model for decoding is adapted to acquire a context-based adaptive probability model for decoding, in which the context-based adaptive probability model for decoding is a statistical result of a greater probability event on each bit of the index of the reference frame;

the ninth module for arithmetic decoding is adapted to arithmetic decode the arithmetically encoded bitstream according to the context-based adaptive probability model for decoding corresponding to the bit whereby acquiring a binary value of the bit;

the tenth module 24 for producing the index of the reference frame is adapted to acquire the index of the reference frame according to the binary value of each bit;

the eleventh module 25 for acquiring the prediction block is adapted to acquire the prediction block of the reference frame according to the index of the reference frame; and the twelfth module 26 for calculating the reconstruction block is adapted to average pixel values of the prediction blocks to obtain a pixel value of the reconstruction block, in which the reconstruction block is the image block to be encoded.

In a preferred embodiment of the invention, the decoder further comprises: a thirteenth module 27 for updating the probability model for decoding, which is adapted to update the context-based adaptive probability model for decoding corresponding to the bit according to the binary value of the bit.

Figure 3:
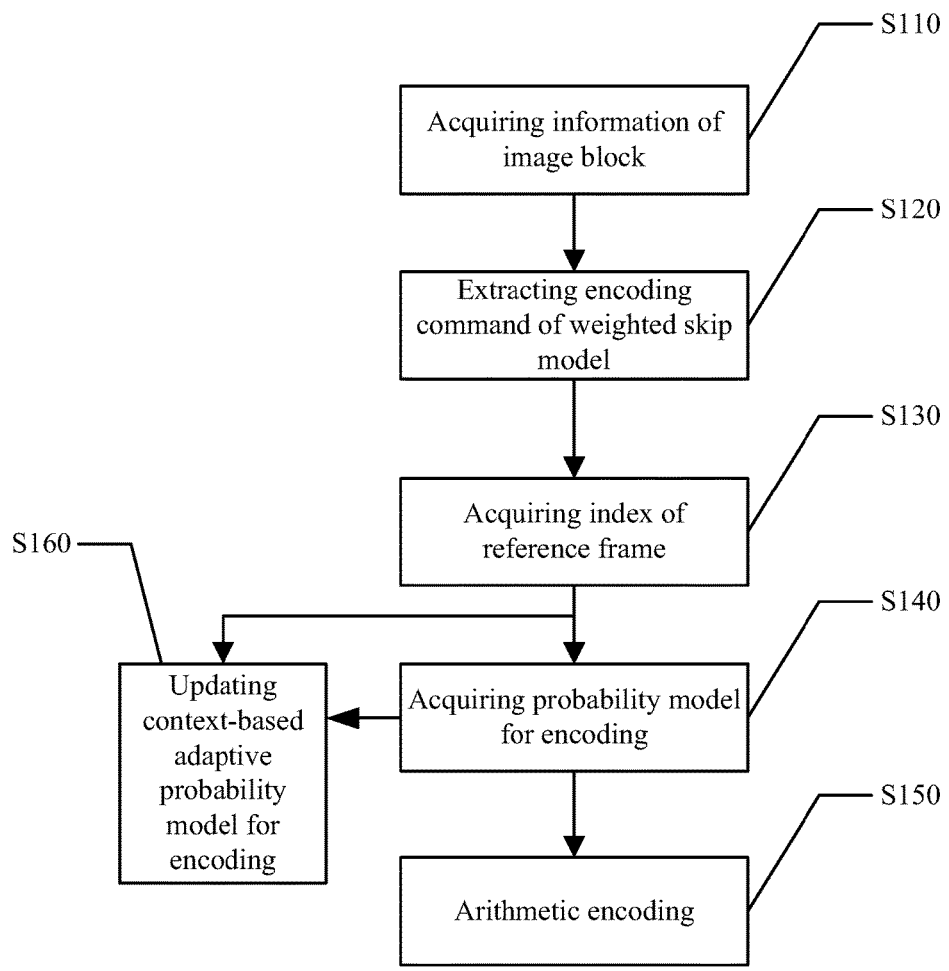
FIG. 3 is a flow chart of an encoding process in accordance with one embodiment of the invention.
Figure 4:
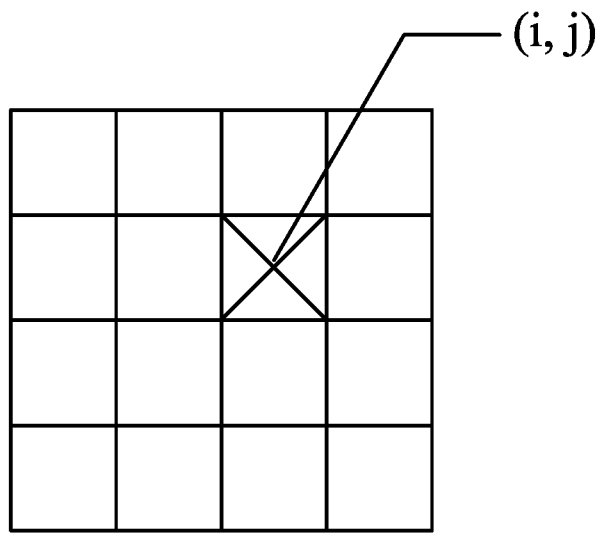
FIG. 4 is a diagram showing a position of an image block to be encoded in accordance with one embodiment of the invention.

Based on the above arithmetic codec for compression of the video image block by the weighted skip model, it is also provided an arithmetic encoding-decoding method for compression of a video image block by the weighted skip model. The method comprises an encoding process and a decoding process. FIG. 3 illustrates a flow chart of the encoding process, and the encoding process specifically comprises the following steps:

S110: acquiring the information of the image block. The information of the image block to be encoded is acquired. As shown in FIG. 4, an image frame to be currently displayed is illustrated. In one embodiment of the invention, the current image frame can be previously divided into several image blocks. A size of each divided image block is configured accorded to practical demand A (i, j)th block is one of the image blocks to be encoded in the current image frame, and (i, j) is position coordinates of the image block to be encoded. Relative attribute information of this image frame can be acquired according to the image frame to be encoded, such as the image frame is an F-frame or a P-frame.

S120: extracting an encoding command of the weighted skip model. The command of the weighted skip model is extracted. Generally, in the encoding process of the image block to be encoded by the encoder, different encoding models are tried previously (such as a skip model, an intra-prediction model, a forward prediction model, and the weighted skip model), encoding effects of these different encoding models are previously calculated, and an optimal model is selected. In this embodiment, if the weighted skip model is considered to be the optimal model, the command of the weighted skip model is then acquired. In other embodiments, the weighted skip model can also be preset as the encoding model by the system.

S130: acquiring the index of the reference frame. The index of the reference frame is acquired according to the information of the image block to be encoded and the command of the weighted skip model. Each reference frame comprises the prediction block for reconstructing the image block to be encoded. The reference frames are selected from a plurality of frames in front of the image frame to be currently displayed. In this embodiment, the reference frames are selected from four image frames (I-frame, F-frame, and/or P-frame) in front of the image frame to be currently displayed according to a standard of ASV2, and the frame which is the most neighboring to the image frame to be currently displayed is the required reference frame. For convenient description hereinbelow, the four image frames are four alternative image frames. In a specific embodiment of the invention, indexes are added to the four frames, respectively, according to distances between each of the four image frames and the image frames to be displayed in an ascending order, for example, the index of the most neighboring image frame to the image frame to be currently displayed is 0, and the indexes of the later three image frames are 1, 2, and 3, respectively. It should be noted that, in other embodiments of the invention, when the number of image frames in front of the image frame to be currently displayed is less than 4, the indexes must be added according to the actual number of the image frames. For example, when only two image frames are disposed in front of the image frame to be currently displayed, the two image frames are respectively labeled with the indexes of 0 and 1; and when three image frames are disposed in front of the image frame to be currently displayed, the three image frames are respectively labeled with the indexes of 0, 1, and 2. After the weighted skip model is determined as the encoding mode by S120, it is tried to encode each image frame corresponding to the indexes, and encoding effects of these image frames are compared so as to select the optimal image frame as the reference frame and acquire the index of the reference frame. It should be noted that, when only two image frames are disposed in front of the image frame to be currently displayed, both the two image frames are selected as the reference frames; and when only one image frame is disposed in front of the image frame to be currently displayed, the only image frame is selected as the reference frame, which is similar to the conventional skip model.

In a preferred embodiment of the invention, a binary number is preferably adopted to represent the index of the reference frame, and a bit number of the binary number is determined based on the frame number of the reference frames. In a specific embodiment of the invention, the bit number of the binary number is $[Log_2N]$, in which N represents the frame number of the alternative image frames, the symbol [ ] represents operation of rounding upwards. According to the standard of ASV2, N is equal to 4, thus, the bit number of the index of the reference frame is 2, as illustrated by A0 and A1 in FIG. 5. The binary numbers 00, 01, 10, and 11 respectively correspond to decimal numbers 0, 1, 2, and 3.

Figure 5:
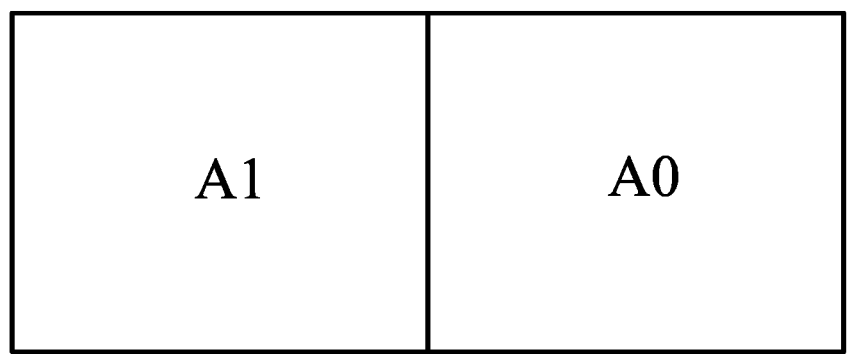
FIG. 5 is a diagram showing an index of a reference frame represented by a binary number in accordance with one embodiment of the invention.

S140: acquiring the probability model for encoding. The context-based adaptive probability model for encoding is acquired. The context-based adaptive probability model for encoding is the context-based adaptive probability model adopted in the encoding process. In a specific embodiment of the invention, the context-based adaptive probability model for encoding is the statistical result of the greater probability event on each bit of the index of the reference frame. Taken the frame number N of the alternative image frames equal to 4 as an example, the bit number of the binary number of the index of the reference frame is 2. As shown in FIG. 5, the context-based adaptive probability mode for encoding is the greater probability event on each bit of A0 and A1. For example, when the occurrence probability of "1" is larger than the occurrence probability of "0", then the greater probability event on the bit A1 is recorded as 1 and its probability, otherwise, the greater probability event on the bit A1 is recorded as 0 and its probability. The determination of the greater probability event on the bit A0 is similar to the above.

S150: arithmetic encoding. The index of the reference frame is arithmetic encoded and written into the arithmetically encoded bitstream according to the context-based adaptive probability model for encoding.

In a specific embodiment of the invention, the encoding process further comprises the following step after S130:

S160: updating the context-based adaptive probability model for encoding. The context-based adaptive probability model is updated according to the acquired index of the reference frame. As described in S140 in the above, the context-based adaptive probability model for encoding is the statistical result of the greater probability event on each bit of the index of the reference frame. When the new index of the reference frame is acquired, the statistical result on each bit may change, thus, it is necessary to update the acquired context-based adaptive probability model for encoding. For example, a simple updating method is as follows: given that the greater probability event on the bit A0 is "0 with a probability of n %", in which, n≥50, the bit A0 of the newly acquired index of the reference frame is 0, then the greater probability event on the bit A0 is updated to be "0 with a probability rate of (n+1) %". When n=50, and the bit A0 of the newly acquired index of the reference frame is 1, then the greater probability event on the bit A1 is updated to be "1 with a probability rate of 51%". In other embodiments of the invention, the probability of the greater probability event can be updated by other means.

It should be noted that, in other embodiments of the invention, the encoding process further comprises initiating the context-based adaptive probability model for encoding, that is, at the first time the command of the weighted skip model is acquired, the context-based adaptive probability model for encoding can be initiated, and the initiated context-based adaptive probability model for encoding can be preset according to practical demands.

Figure 6:
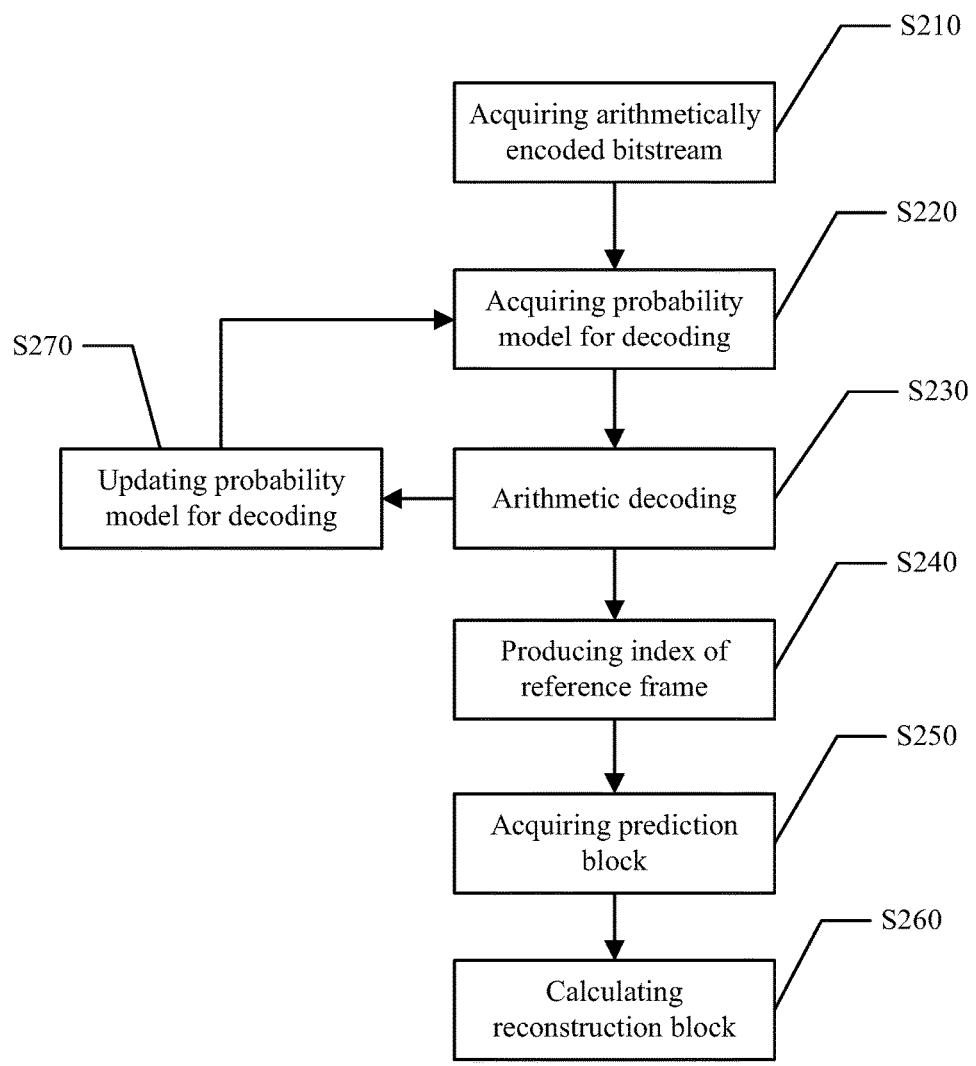
FIG. 6 is a flow chart of a decoding process in accordance with one embodiment of the invention.

The arithmetic encoding-decoding method in the compression of the video image block further comprises the decoding process, the flow chart of which is illustrated in FIG. 6, and the decoding process specifically comprises the following steps:

S210: acquiring the arithmetically encoded bitstream. The arithmetically encoded bitstream of the index of the reference frame is acquired. The arithmetically encoded bitstream comprises the index of the encoded reference frame.

S220: acquiring the probability model for decoding. The context-based adaptive probability model for decoding is acquired. The context-based adaptive probability model for decoding is the statistical result of the greater probability event on each bit of the index of the reference frame. In one embodiment of the invention, the context-based adaptive probability model for decoding is consistent with the context-based adaptive probability model for encoding. Similarly, in a preferred embodiment, when the decoding process is executed for the first time, the context-based adaptive probability model for decoding is firstly initiated.

S230: arithmetic decoding. The arithmetically encoded bitstream is arithmetically decoded according to the context-based adaptive probability model for decoding corresponding to the bit whereby acquiring the binary value of the bit;

S240: producing the index of the reference frame. The index of the reference frame is acquired according to the binary value of each bit. As shown in FIG. 5, the index of the reference frame can be acquired according to the binary values of the bits A1 and A0, for example, the index of the reference frame corresponding to the binary number 11 is 3.

S250: acquiring the prediction block. The prediction block of the reference frames is acquired according to the index of the reference frame. It should be noted that the 0th frame is the acquired reference frame according to the standard of ASV2. The other reference frame is determined according to the produced index of the reference frame in S240: 11 corresponds to the 3rd frame, 10 corresponds to the 2nd frame, and 01 corresponds to the 1st frame. The 0th, 1st, 2nd, and 3rd respectively correspond to the first frame, the second frame, the third frame, and the fourth frame disposed in front of the image frame to be currently displayed. After the two reference frames are determined, positions of the two prediction blocks in the two reference frames (each reference frame corresponding to only one prediction block) can be respectively acquired according to motion vectors of adjacent image blocks (such as (i+1, j−1), (i+1, j+1), etc.) of the image block (i, j) to be encoded.

S260: calculating the reconstruction block. The pixel values of the prediction blocks are averaged to obtain the pixel value of the prediction. The reconstruction block is the image block to be encoded. It should be noted that, in one specific embodiment, the average of the pixel values of the prediction blocks is an arithmetic mean of the pixel values of the two prediction blocks, and the arithmetic mean is rounded off. In other embodiments, the arithmetic mean can be directly rounded. The pixel value calculated by averaging is the pixel value of the image block to be encoded.

In one specific embodiment, the decoding process of the invention further comprises the following step after S230:

S270: updating the probability model for decoding. The context-based adaptive probability model for decoding corresponding to the bit is updated according to the binary value of the bit. The principle of this step is the same as S160.

Because the index of the reference frame is arithmetic encoded according to the context-based adaptive probability model for encoding, the decoding and encoding method and the codec of the invention are capable of not only better reflecting the probability distribution of the index of the reference frame but also better reducing the bit rate required in the encoding.

In addition, the updating of the greater probability event and the corresponding probability of the index of the reference frame is realized.

It can be understood by the skills in the technical field that all or partial steps in the methods of the above embodiments can be accomplished by controlling relative hardware by programs. These programs can be stored in readable storage media of a computer, and the storage media include: read-only memories, random access memories, magnetic disks, and optical disks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An arithmetic encoding-decoding method for compression of a video image block, the method comprising an encoding process and a decoding process, the encoding process comprising:
1) inputting an image block to be encoded into an encoder, wherein the encoder comprises a first module for acquiring information of an image block, a second module for extracting an encoding mode, a third module for acquiring an index of a reference frame, a fourth module for acquiring a probability model for encoding, and a fifth module for arithmetic encoding;

2) activating the first module to acquire information of the image block to be encoded and then to transmit the information of the image block to be encoded to the third module;

3) activating the second module to extract an encoding command of a weighted skip model and then to transmit the encoding command of the weighted skip model to the third module;

4) activating the third module to acquire an index of a reference frame according to the information of the image block to be encoded and the encoding command of the weighted skip model, the reference frame comprising a prediction block for reconstructing the image block to be encoded, and then to transmit the index of the reference frame to the fifth module;

5) activating the fourth module to acquire a context-based adaptive probability model for encoding and then to transmit the context-based adaptive probability model for encoding to the fifth module; and 6) activating the fifth module to perform arithmetic encoding of the index of the reference frame and writing arithmetic codes into an arithmetically encoded bitstream according to the context-based adaptive probability model for encoding;

the decoding process comprising:

7) transmitting the arithmetically encoded bitstream to a decoder, wherein the decoder comprises a sixth module for acquiring the arithmetically encoded bitstream, a seventh module for acquiring a probability model for decoding, an eighth module for arithmetic decoding, a ninth module for producing the index of the reference frame, a tenth module for acquiring the prediction block, and an eleventh module for calculating a reconstruction block;

8) activating the sixth module to receive the arithmetically encoded bitstream and then to transmit the arithmetically encoded bitstream to the eighth module;

9) activating the seventh module to acquire a context-based adaptive probability model for decoding and then to transmit the context-based adaptive probability model for decoding to the eighth module, wherein the context-based adaptive probability model for decoding is a statistical result of the greater probability event on each bit of the index of the reference frame;

10) activating the eighth module to perform arithmetic decoding of the arithmetically encoded bitstream according to the context-based adaptive probability model for decoding corresponding to each bit of the index of the reference frame whereby acquiring a binary value of each bit of the reference frame, and then to transmit the binary value of each bit of the index of the reference frame to the ninth module;

11) activating the ninth module to acquire the index of the reference frame according to the binary value of each bit of the index of the reference frame and then to transmit the index of the reference frame to the tenth module;

12) activating the tenth module to acquire the prediction block of the reference frame according to the index of the reference frame and then to transmit the prediction block of the reference frame to the eleventh module; and 13) activating the eleventh module to average pixel values of the prediction blocks to obtain a pixel value of a reconstruction block, wherein the reconstruction block is the image block to be encoded;

wherein:

in the encoder, the first module and the second module are physically connected to the third module; the third module is physically connected to the fourth module; and the fourth module is physically connected to the fifth module; and in the decoder, the sixth module and the seventh module are physically connected to the eighth module; the eighth module is physically connected to the ninth module; the ninth module is physically connected to the tenth module; and the tenth module is physically connected to the eleventh module.

2. The method of claim 1, wherein the index of the reference frame is represented by a binary number, and a bit number of the binary number is determined by image frame counts of the reference frame.

3. The method of claim 2, wherein the context-based adaptive probability model for encoding is a statistical result of a greater probability event on each bit of the index of the reference frame.

4. The method of claim 1, wherein the encoding process further comprises: updating the context-based adaptive probability model for encoding according to the index of the reference frame after acquiring the index of the reference frame.

5. The method of claim 1, wherein the decoding process further comprises updating the context-based adaptive probability model for decoding corresponding to the bit according to the binary value of the bit.

6. An arithmetic codec for compression of a video image block, comprising an encoder and a decoder, the encoder comprising:

a) a first module for acquiring information of an image block, which is adapted to acquire the information of the image block to be encoded;

b) a second module for extracting an encoding mode, which is adapted to extract an encoding command of a weighted skip model;

c) a third module for acquiring an index of a reference frame, which is adapted to acquire the index of the reference frame according to the information of the image block to be encoded and the encoding command of the weighted skip model, wherein the reference frame comprises a prediction block for reconstructing the image block to be encoded;

d) a fourth module for acquiring a probability model for encoding, which is adapted to acquire the contest-based adaptive probability model for encoding; and e) a fifth module for arithmetic encoding, which is adapted to perform arithmetic encoding of the index of the reference frame and write arithmetic codes into an arithmetically encoded bitstream according to the context-based adaptive probability model for encoding;

the decoder comprising:

f) a sixth module for acquiring the arithmetically encoded bitstream, which is adapted to acquire the arithmetically encoded bitstream of the index of the reference frame;

g) a seventh module for acquiring a probability model for decoding, which is adapted to acquire a context-based adaptive probability model for decoding, wherein the context-based adaptive probability model for decoding is a statistical result of a greater probability event on each bit of the index of the reference frame;

h) an eighth module for arithmetic decoding, which is adapted to perform arithmetic decoding of the arithmetically encoded bitstream according to the context-based adaptive probability model for decoding corresponding to the bit whereby acquiring a binary value of the bit;

i) a ninth module for producing the index of the reference frame, which is adapted to acquire the index of the reference frame according to the binary value of each bit;

j) a tenth module for acquiring the prediction block, which is adapted to acquire the prediction block of the reference frame according to the index of the reference frame; and k) an eleventh module for calculating a reconstruction block, which is adapted to average pixel values of the prediction blocks to obtain a pixel value of the reconstruction block, wherein the reconstruction block is the image block to be encoded;

wherein:

in the encoder, the first module and the second module are physically connected to the third module; the third module is physically connected to the fourth module; and the fourth module is physically connected to the fifth module; and in the decoder, the sixth module and the seventh module are physically connected to the eighth module; the eighth module is physically connected to the ninth module; the ninth module is physically connected to the tenth module; and the tenth module is physically connected to the eleventh module.

7. The arithmetic codec of claim 6, wherein the encoder further comprises: a twelfth module for updating the probability model for encoding, which is adapted to update the context-based adaptive probability model for encoding according to the acquired index of the reference frame; and the third module is physically connected to the fourth module through the twelfth module.

8. The arithmetic codec of claim 6, wherein the decoder further comprises: a thirteenth module for updating the probability model for decoding, which is adapted to update the context-based adaptive probability model for decoding corresponding to the bit according to the binary value of the bit; and the seventh module is physically connected to the eighth module through the thirteenth module.

* * * * *